United States Patent [19]
Rosenberg

[11] Patent Number: 5,832,115
[45] Date of Patent: Nov. 3, 1998

[54] TERNARY IMAGE TEMPLATES FOR IMPROVED SEMANTIC COMPRESSION

[75] Inventor: Jonathan David Rosenberg, Monmouth, N.J.

[73] Assignee: Lucent Technologies Inc., Murray Hill, N.J.

[21] Appl. No.: 775,906

[22] Filed: Jan. 2, 1997

[51] Int. Cl.[6] .............................. G06K 9/48; G06K 9/36
[52] U.S. Cl. .......................... 382/199; 382/242; 382/243
[58] Field of Search .................................... 382/242, 199, 382/213, 243, 118, 190, 194, 195, 203, 205, 209, 221, 103; 348/586

[56] References Cited

U.S. PATENT DOCUMENTS

| | | | |
|---|---|---|---|
| 4,975,960 | 12/1990 | Petajan | 395/2.63 |
| 5,450,504 | 9/1995 | Calia | 382/118 |
| 5,642,434 | 6/1997 | Nakao et al. | 382/205 |
| 5,647,027 | 7/1997 | Burges et al. | 382/205 |

OTHER PUBLICATIONS

"Automatic face location detection for model–assisted rate control in H.261–compatible coding of video," Eleftheriadis et al, Signal Processing: Image Communication, vol. 7, pp. 435–455.

*Primary Examiner*—David K. Moore
*Assistant Examiner*—Wenpeng Chen

[57] ABSTRACT

A method and apparatus for carrying out rapid, block-based SAD search operations for facial ellipses in a CIF videophone image frame are disclosed. A set of search templates, each having an ellipse pattern with two concentric, contiguous perimeters is defined and a set of parameter values are calculated off line for each template: a predetermined subfactor, index number, number of pixels in its dithered perimeter pattern, and first and second match thresholds. The pixels in the lower portion of each perimeter in the pattern are thinned by dithering so as to emphasize the upper contour of the ellipse. Values of +2k for interior perimeter pixels and −2k for exterior pixels in the template are then added to corresponding +k edge pixels and −k non-edge pixels in each search position of the template on a thresholded binary edge map of the image frame. The sum is then normalized and the template and search position producing the best SAD match metric value is identified as a facial area, without requiring symmetry detection.

23 Claims, 6 Drawing Sheets

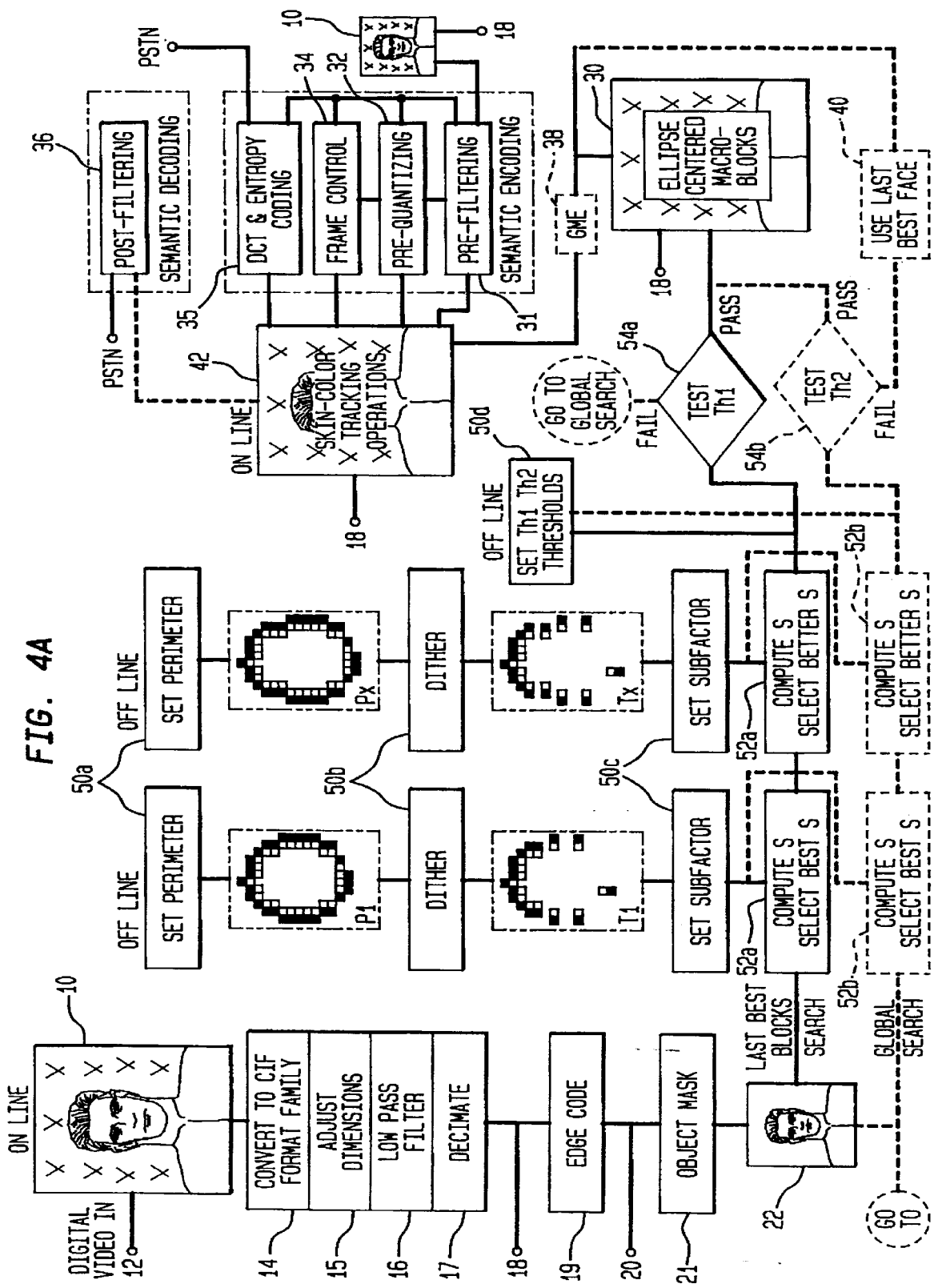

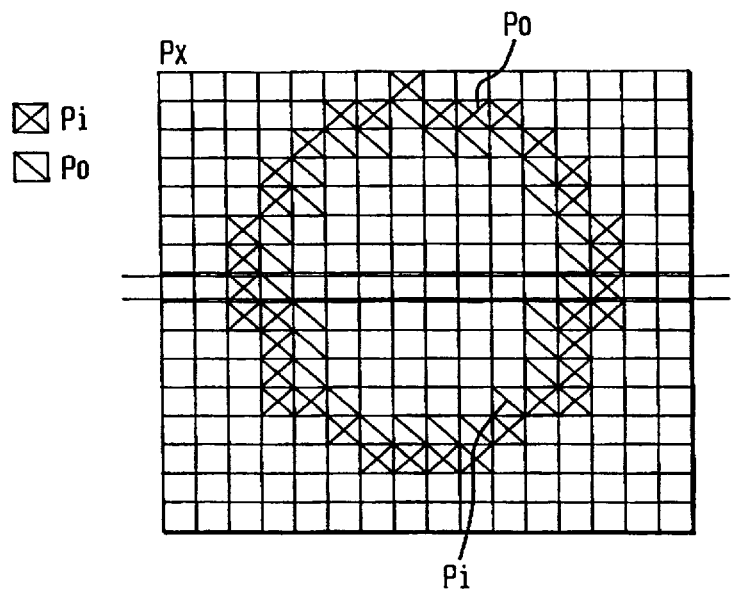
FIG. 5A
FIG. 5B
| -1 | -1 | 0 | 3 | 5 | 6 | 6 | 7 | 6 | 6 | 6 | 5 | 3 | 0 | -1 | -1 |
| -1 | -1 | -1 | 1 | 4 | 5 | 5 | 6 | 6 | 5 | 5 | 4 | 1 | -1 | -1 | -1 |
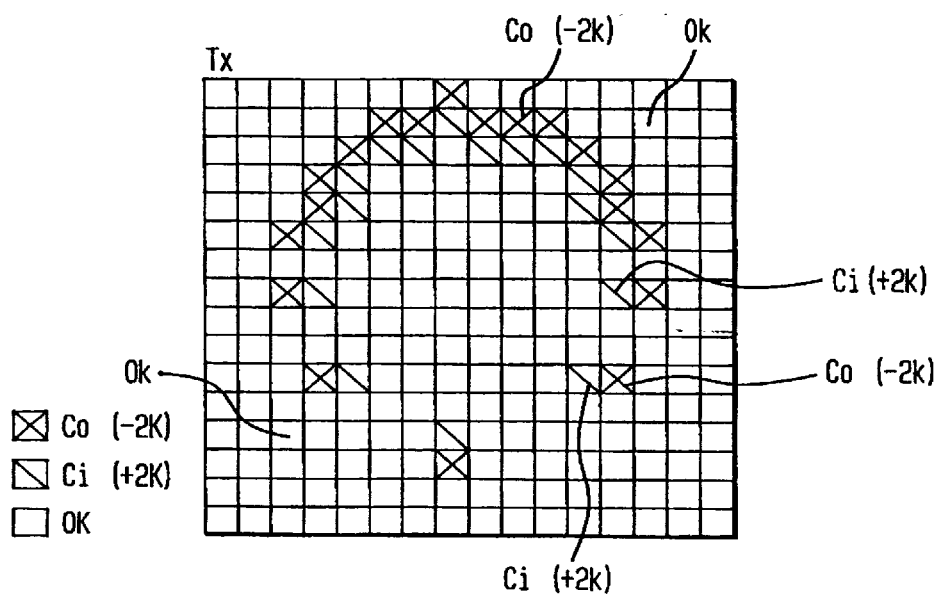
FIG. 5C

TERNARY IMAGE TEMPLATES FOR IMPROVED SEMANTIC COMPRESSION

BACKGROUND OF THE INVENTION

1. Field of the Invention

The present invention is broadly directed to methods and apparatus for detecting objects in an image. In particular, the invention pertains to real-time object tracking.

2. Discussion of Related Art

The International Telephone Union Telecommunications Recommendations (ITU-T No. H.263) specify a particular compression format for transmitting video images over low bit rate channels, that is, 64 kbps and lower. The H.263 encoding, specified in H263ENC, uses Discrete Cosine Transform (DCT) processes to encode a prediction error for intra-frame image data and inter-frame motion, as in the Motion Picture Experts Groups (MPEG) standard that was devised for video recording.

The compression encoding format specified by H.263 is based on segmentation of individual image frames in the video-frame sequence of the incoming video signal into 16×16-pixel (pel) motion-compensation macroblocks. The area of each motion-compensation macroblock coincides with four 8×8-pel DCT-coded image blocks that each contain four 8×8-pel luminance-averaging blocks (Y), and with respective 8×8-pel (U) and (V) chrominance blocks, each corresponding to the entire area of the 16×16-pel macroblock.

The video encoder/decoder platform (codec) disclosed in the commonly-assigned U.S. patent applications Ser. No. 08/727,862, filed Oct. 8, 1996, and Ser. No. 08/500,672, filed Jul. 10, 1995, incorporated herein by reference, is directed toward the compression requirements of a video-conferencing system (the "conferencing codec"). Thus it was not designed for compression-coding video images at the very low PSTN-type bit rates that must be accommodated by codecs used in consumer videophone communications devices, bit rates below 25.6 kbps, but rather for use in the 3D codecs for video-conferencing that use 128 kbps sub-band channels of the type available on ISDN networks.

That conferencing codec uses ellipse detection supplemented by symmetry verification for implementing a differential, finer quantization in "facial" areas of each image frame. This "semantic" differential coding process, shown schematically in FIG. 1, is partially frame-independent in that the semantic structure of previous frames is used to provide default values for later frames. As shown in FIGS. 1 and 2, the conferencing codec prepares a binary edge map 20 for each image frame 10 that it processes. Each 360×240-pel video image frame 10 is low-pass filtered at 16 and then decimated at 17, by a factor of 8, to produce a 45×30-pel array at 18. In the second-stage of the ellipse-tracking process, the symmetry-testing stage, an image frame decimated by 2 is substituted for this array (decimated by 8) that was used here in the cross-correlation stage, to preserve finer detail.

In preparation for edge coding, at block 19 the image was simply low-pass filtered for smoothing. However a conferencing codec may also use pre-filtering 32 to prepare the digital video frame 10 for DCT encoding, as shown in FIG. 1. This step 32 uses a linear 3×3 FIR non-separable filter to prepare the image array 18 for the final coding process:

$$\begin{vmatrix} 1/N^2 & 1/N & 1/N^2 \\ 1/N & 1 & 1/N \\ 1/N^2 & 1/N & 1/N^2 \end{vmatrix}$$

The strength S of the pre-filtering operation performed is semantically controlled by a variable N where $S=1+4/N+4/N^2$ and the filter is defined as:

$$y_{i,j} = \frac{1}{S} \sum_{k=-1,l=-1}^{k=1,l=1} h_{k,l} x_{i-k,j-l}$$

where $H_{k,l}$ represents the elements of the linear 3×3 matrix FIR non-separable filter, e.g. $H_{-1,-1}$ represents the upper left element $1/N^2$ and $H_{1,1}$ represents the lower right element $1/N^2$;

$X_{i,j}$ represents the pels in the input image to which the pre-filtering operation (block 32 in FIG. 1) is applied; and $Y_{i,j}$ represents the output pels of the pre-filtering operation.

Decreasing values of N are assigned to areas of the image frame in the following order:

1. Edge Pixels inside the Ellipse-area blocks
2. Non-edge Pixels inside the Ellipse-area blocks
3. Edge Pixels inside Skin-color blocks
4. Non-edge Pixels inside Skin-color blocks
5. Edge Pixels inside moving regions
6. Non-edge Pixels inside moving regions
7. Background pixels The edge-mapping 19 is carried out by Sobel filtering 19a that applies two 3×3 filter matrixes $\delta_x$, $\delta_y$ to the 45×30-pel input matrix 18 in a manner well known in the art:

$$\delta_x = \begin{vmatrix} -1 & 0 & 1 \\ -2 & 0 & 2 \\ -1 & 0 & 1 \end{vmatrix} \quad \delta_y = \begin{vmatrix} 1 & 2 & 1 \\ 0 & 0 & 0 \\ -1 & -2 & -1 \end{vmatrix}$$

The Sobel filters produce a gradient-value matrix (not shown). A minimum-gradient threshold 19b is then applied to the resulting gradient values to select pixels in the gradient-value matrix for the binary edge map 20 that is shown in FIG. 2.

After preparing the binary edge map 20 for a given image frame 10, the conferencing codec uses a two-stage test to detect elliptical head outlines: ellipse detection followed by a symmetry-test stage verifying that the ellipses detected in the first stage is someone's head. As shown in FIG. 3a, the conferencing codec detects elliptical contours in the image using a three-step search procedure:

In Step 1 of ellipse detection stage, 5×5 blocks of the binary edge map 20 of a video image frame 10 are coarsely scanned, row by row, for rows having a contiguous run of blocks containing at least one edge pixel.

In Step 2, each such run of blocks is fine scanned to detect the first line in the blocks in each run of blocks that contains non-zero pixels. Within that line, the line segment that begins and ends with the first and last non-zero pixels, $(x_{start}, y)$ and $(x_{end}, y)$, respectively, defines a horizontal scanning region that is then searched in Step 3.

Finally, in Step 3, the horizontal scanning region of the edge map 20 that was defined in Step 2 is searched for an edge contour that best fits some one curve in a set of ellipsoid-curve facial templates $C_1$ through $C_x$, a series of parameterized ellipse-curve patterns 24 having different sizes and aspect ratios. To search a selected scanning region within the binary edge map 20, the top of the ellipse pattern 24 in each template $C_1$ through $C_x$ is moved along the line segment that is defined by ($x_{start}$, y) and ($x_{end}$, y).

The codec scans the ellipse pattern 24 in each template across the line segment between ($x_{start}$, y) and ($x_{end}$, y) in the binary edge map 20 to detect curves correlating with parameterized ellipses of arbitrary size and tilt represented by the equation $ax^2+2bxy+cy^2+2dx+2ey+f=0$, where $b^2-ac<0$. As shown in FIG. 3b, each of these ellipse-curve patterns 24 has a center ($x_0$, $y_0$), major axis 2A, minor axis 2B and a weighted segment $Q_u$. As a practical matter, the major-axis tilt angle θ is ignored in the conferencing codec's search for a best fit. Thus, in all elliptical patterns 24 used in the scanning templates $C_1$ through $C_x$, the tilt angle θ=0°.

Ellipse-detection success is improved by multiplying pixel values in the upper part of the ellipse $Q_u$ by a predetermined weighting factor. This weighting of each template de-emphasizes the weaker, less reliable edges found in the chin-and-shoulders area. Also, objects blocking the lower part of the face are less likely to interfere with the search for these top-weighted ellipse patterns. The selective computations required for each position of the ellipse template, however, are awkward and burdensome.

Ellipse Correlation

The conferencing codec uses a floating-point binary cross-correlation process to evaluate the edge contours found in the selected scanning region by scanning each line segment that was defined in Step 2 of the detection process shown in FIG. 3a. In Step 3, intensity values $I_i$ and $I_e$, and a floating-point fit index R, are computed and compared as follows:

1) In each template, the value "1" is assigned to all pixels (i, j) that are located on or inside the ellipse pattern 24. The value "0" is assigned to the rest of the pixels in that template, that is, those that are outside that pattern 24.

2) At each scanning position, the uppermost pixel in the pattern 24 is overlaid on one of the pixels in the line beginning with ($m_{start}$, n) and continuing through ($m_{end}$, n) in the binary edge map 20. Two sets of pattern-contour pixels found on the binary edge map 20 are summed, $C_i$ and $C_e$. At each scanning position, the interior contour $C_i$ map pixels (m, n) are pixels within an M±L×N±L neighborhood of the location (M, N) of a map pixel that corresponds to a, 0-valued exterior pixel (i, j). Exterior-contour Cc map pixels (m, n) are pixels within an M±L×N±L neighborhood of a pixel on the map that corresponds to a 1-valued interior pixel or contour pixel (i, j). These localized calculations are ill-suited to SIMD array operations.

The conferencing codec's determination of the fit-index is a floating-point computation using the p value assigned to each $C_i$ and $C_e$ pixel (m, n) where p=1w. The weighting factor w is fixed at "1" except for pixels (M, N) corresponding to a respective pixel (i, j) within the weighted area $Q_u$ on the template. In the weighted area $Q_u$ the weight w increases to w>1, that is, "1.5" or some other convenient value. The conferencing codec's floating-point fit index R is then $(1+I_i)/(1+I_e)$ where the weighted floating-point average of all $C_i$ pixel values p(m, n) is the intensity value $I_i$, and the floating-point average of all $C_e$ pixel values p(m, n) is the intensity value $I_e$:

$$I_i = \frac{1}{|C_i|} \sum_{(m,n) \in C_i} w_{m,n} p(m,n) \text{ and } I_e = \frac{1}{|C_e|} \sum_{(m,n) \in C_e} p(m,n)$$

As a further precaution, since the conferencing codec's index R is only responsive to the relative sizes of the intensity values $I_i$ and $I_e$, those values must be controlled by respective threshold limits $I_i > I_{min}$ and $I_e < I_{max}$ to eliminate irrelevant $I_i$ and $I_e$ values from among the facial-ellipse candidates. These thresholds $I_{min}$ and $I_{max}$ eliminate locations where the data used in detecting the ellipse is so large or so small as to be either invalid or insignificant, respectively.

Symmetry Testing

Since the geometry of neck and shoulder areas and other objects in the frame may also have elliptical contours, the conferencing codec next verifies that the detected ellipse-like contours are faces at 28, by testing for symmetry within a tightly restricted rectangular eyes-nose-mouth region W inside each ellipse, as shown in FIG. 3c. The region W inside each of the ellipses detected in the first stage is tested for facial symmetry in order of the ellipses' declining correlation-reference values R until symmetry is found. Where symmetry is found, the ellipse is verified as being a facial ellipse. If no symmetry is found or if no ellipse is located in the frame, the conferencing codec uses the skin-color tracking values from the previous image frame serve as default values to maintain consistent image-coding semantics.

To implement the symmetry-test stage, a fixed-size rectangular symmetry-test region 30 is determined for each ellipse template for use as a symmetry template W. The size of the template W is fixed relative to the major axes 2A and minor axes 2B of the detected ellipse. The template W, as can be seen in FIG. 3c, has the same center ($x_0$, $y_0$) as the ellipse-patterns 24. The symmetry template W includes a rectangular, weighted upper portion $W_u$ and a trapezoid-delimited area T. The axis of symmetry D overlays the major axis 2A of the ellipse and has the axis angle θ relative to the vertical axis of the frame.

Only the binary edge-map pixels (m, n) within the trapezoidal area $A_T$ are used to calculate a symmetry index $S(x_k, y_k, \theta_k)$ for each rotation $\theta_k$ of the template W within the ellipse centered at ($x_k$, $y_k$). This reduces the risk of irrelevant edge contours invalidating the symmetry index. The binary values b of those pixels (m, n) and pixels symmetrical to them S(m, n) across the axis D are used to generate symmetry values $a_{m,n}$:

$a_{m,n}=1$, if $b(m, n)=b[S(m, n)]=1$ $a_{m,n}=0.5$, if $b(m, n)=b[S(m, n)]=0$

The symmetry index $S(x_k, y_k, \theta_k)$ gives double value to edge-pixel symmetry in counting all instances of symmetry occurring within the trapezoid A(T), and a factor w>1 also emphasizes symmetry found among those pixels in the eye area $W_u$ of the template W. This symmetry index is calculated as follows:

$$S(x_k, y_k, \theta_k) = A(T) \left( \sum_{(m,n) \in T \cap W_u} wa_{m,n} + \sum_{(m,n) \in T \setminus W_u} wa_{m,n} \right)$$

Although limiting the symmetry test to pixels within the trapezoidal area T reduces false positives, it is not appropriate for array-processor implementation because it partitions image pixels: in each image frame, only the areas T within the areas W defined for each ellipse are tested. The re-computing of the binary edge map in each frame for the symmetry test so that more details of the facial features are preserved is duplicative, but can be parallel processed. The tilt angle θ of the major axis 2A of the detected ellipse and the facial axis of symmetry can no longer be ignored now, at this symmetry-testing stage, as it could be at the ellipse-detection stage. Templates representing a range of θ values must now all be applied to the re-computed binary edge map. This remapping of the binary edge pixels and the need to test ellipses using various rotations of the axis of symmetry slow this second stage in the facial-tracking module.

Finally, any turning away of the facial plane foreshortens one side of a face. To accommodate the facial asymmetry occurring when a person moves, symmetry must be loosely but cautiously defined, further complicating the operation of the facial-tracking module. The symmetry test produces false positives when the symmetry definition is too loose, and finds no facial ellipses in a frame whenever the person turns to one side, when this definition is too tight. As a practical matter, this symmetry-test is presently impossible to implement in real time in a consumer-oriented product.

Although the conferencing codec discards ellipses lacking the loosely-symmetrical elements required by the symmetry test 28, the macroblock parameters of facial area identified in the previous frame 40 are used. Thus, after the head tilts or rotates so far that previously-detected facial symmetry is lost, the macroblock parameters of the elliptical face area in the last frame 40 are simply duplicated until ellipse-based tracking is again successful. Fine resolution is continuously provided to the areas where a head was last found to maintain consistency in the coding of these critical areas until a head is found in a subsequent frame. This maintains a degree of coding continuity, even when only the back of the head is seen in a frame. The macroblocks having a majority of their pixels within the verified facial ellipse are selected as facial macroblocks. Of course, this involves another floating-point computation.

Videophone Image Compression

Videophone encoder/decoder platforms are, ideally, very flexible, so as to be compatible with a variety of coding rates, input resolution levels and coding modes, thus accommodating a wide variety of line conditions and hardware configurations. The video coding rate may range from 10 to 24 kbps. Input resolution for videophones may be the in Common Intermediate Format CIF (352×288) that is used in the ITU and MPEG standards, or SIF (360×240), QCIF (176×144), QSIF (180×120) or sub-QCIF (128×96), etc. There are also a variety of coding modes. In particular, a constant frame rate (CFR) mode is preferable for simple, static background "talking heads" video material encoded at rates above 16 kbps, but use of this coding mode degrades the image quality of more complex scenes which benefit from the ability of variable frame-rate (VFR) processes to emphasize detail by lowering the actual frame rate and is too rigid for optimum coding at very low frame rates.

The very low bit rates required by existing telephone networks are particularly problematic for consumer-oriented real-time video communications. Standing alone, the DCT-based compression scheme specified by H.263 provides quantization that is excessively coarse for videophone communications when conventional quantization schemes are used. Coarse quantization produces two main types of image degradation: block artifacts and mosquito noise.

Block artifacts are square patterns caused by excessively sharp discontinuities in the intensity of neighboring blocks, caused by excessively high quantizer values. Block artifacts may occur when DCT values are calculated for blocks that are too large, which also may result in an excessive variability in intensity from block to block. On the other hand, smoothing DCT values without regard for semantics smears desirable details, degrading the received video image.

Mosquito noise, caused by image-compression processes that excessively filter images, smears sharp edges and fine detail. For very-low bit rates, this smearing makes the filtering of video images without regard for semantics-driven variations in optimal filtering levels within each image commercially non-viable. In such systems mosquito noise produces artificial, mask-like facial expressions because the images lack detail around the eyes. The visual texture of the image as a whole is also generally excessively bland and flat. These artifacts are especially troublesome in the context of facial images, the images that are critical to the success of in videophone technology. As a practical matter, the compression system specified by the H.263 standard must be refined to eliminate these artifacts if videophones are to enjoy success in the consumer marketplace. In particular, the problem of mosquito noise in videophone communications can be reduced, even eliminated, if reliable semantics-dependent compression can be implemented in real time.

Quick and robust facial-contour search operations are the key to successful real-time semantic compression coding. However, the parametric and localized cross-correlation, symmetry-verification, macroblock selection and motion-compensation calculations used by the conferencing codec for improving the performance provided by the H.623 semantic compression standard are not well-suited to real-time implementation because of the computational burden they impose on the encoder. This is a serious stumbling block in the effort to develop satisfactory consumer videophone units.

For the sake of simplicity it is desirable to limit the number of pixels evaluated so that only values for pixels corresponding to the pattern pixels are considered. Those are the $C_i$ and $C_e$ pixels in the cross-correlation used by the conferencing codec. However, block-based motion estimation routines are often the fastest contour-search engines found on currently-available Digital Signal Processing (DSP) image co-processor units.

The selective, parametric determinations and evaluations of template pixels are both incompatible with the efficient, block-based single-instruction-multiple-data (SIMD) structures used in those DSP units. Specifically:

1) The conferencing codec's binary cross-correlation and ellipse-majority determination are floating-point operations incompatible with integer operations provided by DSP units.
2) The conferencing codec's search operations using parameterized ellipses as templates are incompatible with block-based array-processor operations.
3) The conferencing codec's weighting of pixels after they are found on the contour of template area $Q_u$ in the search routine is also incompatible with block-based array-processor operations.

In general, the speed-optimized SIMD operations used by DSP image co-processor units, such as the sum-and-absolute-difference (SAD) instructions used by DSP units, are not applicable to the facial-tracking routine proposed for the conferencing codec.

SUMMARY OF THE INVENTION

The present invention provides an accelerated match metric determination implementing improved semantic image-compression control well-suited for videophone systems and video-conferencing equipment using PSTN channels, and other low bit-rate channels requiring high levels of video compression. It is also suitable for use in other semantic image-coding applications in place of slower, more computation-intensive, parametric floating-point feature-tracking operations such as those proposed for use in video-conferencing communications links using ISDN sub-band channels.

In accordance with the present invention, block operations are modified to replace the selective on-line weighting and cross-correlation operations previously relied upon in semantic image-compression codecs for feature tracking, to achieve the computational speed needed to track faces in on-line semantic video-image compression. The block operations use a predetermined dithered, ternary-valued template to emulate feature-detection methods developed for general-purpose central processors, without using parametric floating-point operations. Instead, the advantageously faster, block-processed SAD integer-accumulation operations available in inexpensive, special-purpose DSP video co-processors are used to provide a match metric that parallel-processes array values and estimates their correlation.

In accordance with the present invention, a template having a feature pattern comprising first and second feature contours is used to detect a given feature in an image frame. Scalable ternary template values are assigned to pixels in each feature contour and to the remaining pixels in the template, respectively. A set of sum-and-absolute-difference values are calculated for edge-map pixels corresponding to the template pixels for each position of a template on the edge map. Each set of sum-and-absolute-difference values is used to calculate an estimated correlation between the feature contours on one template and edge contours at each location of that template on the edge map.

The estimated correlation provides a match metric for determining a best match metric for each template indicating which location of each template provides the best fit between that template and the edge map. Preferably the best match metrics for respective templates are normalized and then used to determine a best match metric for the edge map indicating the location of the best correlation between a feature pattern and the edge map.

In a preferred embodiment, a pattern having a pair of ellipsoid face-edge contours is defined for each template off-line. A lower portion of each pattern is dithered to remove pixels from each contour so that contour pixels in the upper portion of the pattern are more likely to be contiguous with other contour pixels in each respective contour than those in the lower portion of the pattern, where the contour pixels in each respective contour are farther from each other.

In a preferred embodiment, a K(M×N)+x+y matrix derived from each image frame is trimmed and filtered to a pixel matrix having an M×N size required by the array processor, so that the M×N pixel matrix represents the image frame. The pixel matrix is converted to a binary edge map by the array processor.

Preferably one of two scalar values +k and −k are assigned to edge pixels in the map. All other pixels are assigned the other value. In addition, each template pattern is made up of a respective pair of contiguous first and second contours comprising pixels assigned values of +2k and −2k, respectively, on a background comprising pixels that are assigned the value 0k.

Preferably each template is moved on a background-free edge map to positions 1 pixel apart. At each position of the template on the edge map, the template is compared to the edge map by subtracting the values of their corresponding pixels. This subtraction produces a respective occupancy matrix containing absolute values from k to 3k that are the remainders of that comparison. In a particular embodiment, the occupancy matrix is calculated by a video-compression processor (VCP) unit using a motion-compensation command using all template pixels $T_{i,j}$ and corresponding edge map pixels $M_{i,j}$:

$$S = \sum_{i=0}^{X} \sum_{j=0}^{Y} |T_{i,j} - M_{i,j}| = 2k(N_I + E_e) + kXY$$

Preferably the estimated correlation at each position of each template is a function of the sum of the number of edge/exterior-pattern pixels $E_E$ and non-edge/interior-pattern pixels $N_I$ in the occupancy matrix.

Preferably the estimated correlation at each position of each template is calculated as the ratio of the remainder of the sum of the differences between the values assigned to respective pixels in the respective template and the values assigned to corresponding pixels in the edge map less the subfactor for that template to 2k times the total number of pixels $P_E+P_I$ in the template pattern.

In a particular embodiment the match metric determined for each occupancy matrix is scaled by an arbitrary constant $\alpha$ to maintain a convenient dynamic range for the computation of these values:

$$MM = \alpha \frac{E_E + N_I}{P_E + P_I}$$

Preferably the match metric is then normalized for comparisons between the best match metrics for respective templates by expressing that summation value as a percentage of the total number of pixels in the given template, which is determined off-line. In a particular embodiment, a subfactor produced by the motion control command supplies the total number of pixels in the template multiplied by the factor "k" independent of the video image.

A match-metric percentage value is obtained using the integer operations of the SIMD processor for a given level of precision "v" by multiplying the adjusted mc summation (S−kXY) by a given "Divfactor", and shifting the product rightward by "v" spaces:

$$\text{Divfactor} = \frac{2^v \alpha}{2k[P_I + P_E]}$$

Ternary match-metric feature detection in accordance with the present invention emulates parameterized floating-point feature tracking operations. However, it requires many fewer instruction cycles and, for head-and-shoulders video images, produces a decoded semantic-compression image frame fully comparable to the quality of the semantic-compression performance achieved by the conferencing codec, but faster and at less cost per codec.

Moreover, extensive observation has shown that the ellipse-detection result of this match-metric evaluation is sufficiently robust that it is, in itself, sufficient for facial tracking in consumer videophone units, without symmetry detection. Also, although global motion correction is advantageous for mobile video operations, it is optional and not needed for stand-alone videophone units.

The match metric for an ellipse detection operation in accordance with the present invention is advantageous in that it enables facial tracking to be implemented in real time by an inexpensive special-purpose SIMD video co-processor operating under the supervision of a simple, inexpensive RISC central processor, rather than requiring a more expensive, all-purpose high-speed central processor. Subsequent chrominance-tracking operations used to supplement the semantics provided by feature detection are readily implemented in SIMD processors.

BRIEF DESCRIPTION OF THE DRAWINGS

The features and advantages of the present invention will be better understood when the description of a preferred embodiment provided below is considered in conjunction with the drawings, wherein:

FIG. 4a is a flowchart of a videophone image compression system in accordance with the present invention;

FIGS. 5a and 5b are diagrams of a dual-perimeter ellipse pattern and top and bottom arrays of y-axis distance values for locations along the x-axis dimension of that pattern in accordance with the present invention; and FIG. 5c is a dithered dual-perimeter ternary ellipse template having pixel values assigned in accordance with the present invention.

In these figures like elements are assigned like reference numerals.

DETAILED DESCRIPTION OF THE PREFERRED EMBODIMENT

Figure 1:
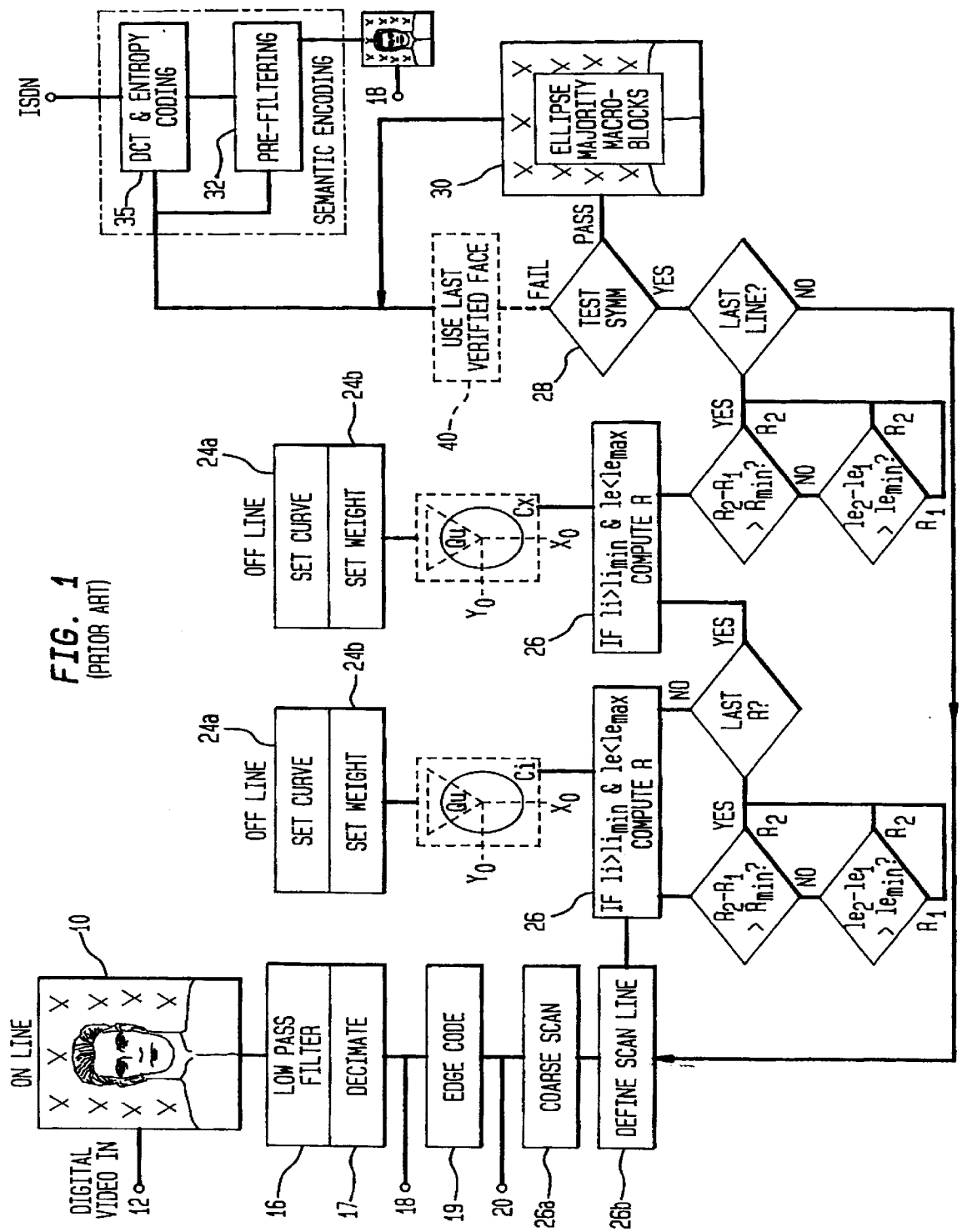
FIG. 1 is a flowchart of a prior art videophone image compression system.
Figure 2:
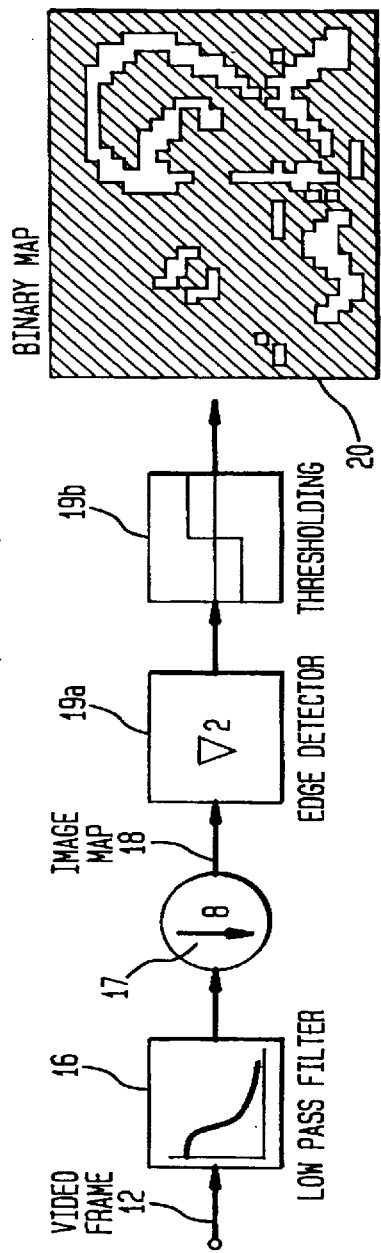
FIG. 2 is a diagram of a prior art process that produces a binary edge map.
Figure 3A:
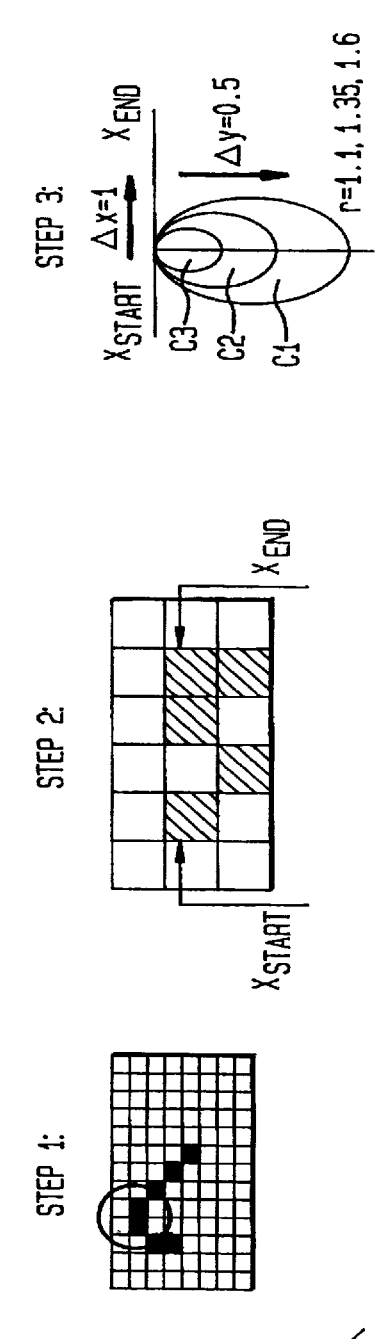
FIG. 3a is a diagram of a prior art ellipse detection method.
Figure 3C:
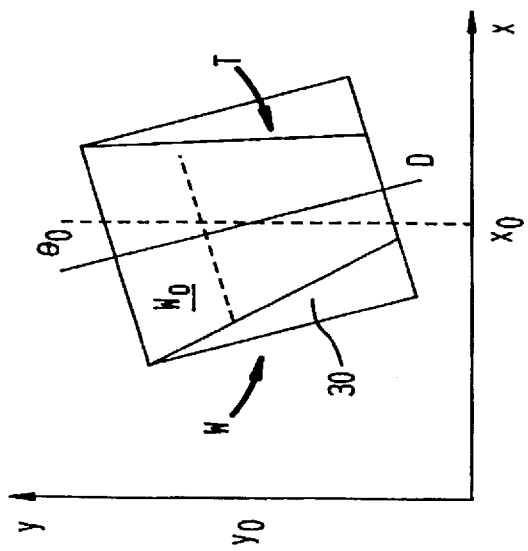
FIGS. 3b and 3c are diagrams of the geometric models used for facial tracking in the prior art compression system of FIG. 1.
Figure 3B:
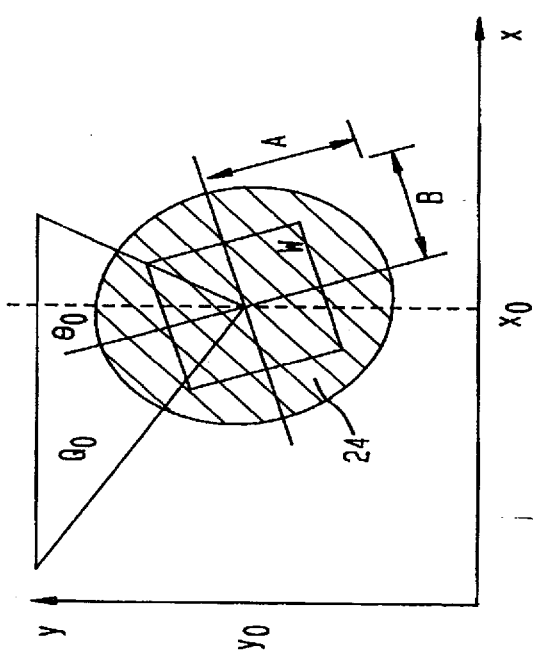

The present invention provides an improved match metric for real-time facial tracking in a consumer-oriented system, designed for the compression-coding of video images at the very low PSTN-type bit rates that must be accommodated by 2D codecs used in consumer videophone communications devices, bit rates below 25.6 kbps, as well as for use in the 3D codecs for video-conferencing that use 128 kbps sub-band channels of the type available on ISDN networks.

With reference now to FIG. 4a, a digital luminance matrix 10 for a video-image from a sequence of frames in an incoming on-line video signal 12 is first converted to a standard digital video format in the CIF-format family, either CIF, QCIF or SQCIF, in a preliminary step 14. This may be done by any suitable means well-known in the art. That CIF-family format is then edge-trimmed at 15 to dimensions convenient for array operations and the remaining pixels in the luminance matrix are decimated at 16, to convert the image matrix to dimensions not greater than the respective dimensions permitted by the array processor. If necessary, one dimension of the decimated luminance matrix is then also padded out with zeros at 17 to match the dimensions of the pixel matrix 18 representing the luminance matrix of the image frame 10 to the dimensions used by the array processor and its matrix-storage memory for its calculations.

Figure 4B:
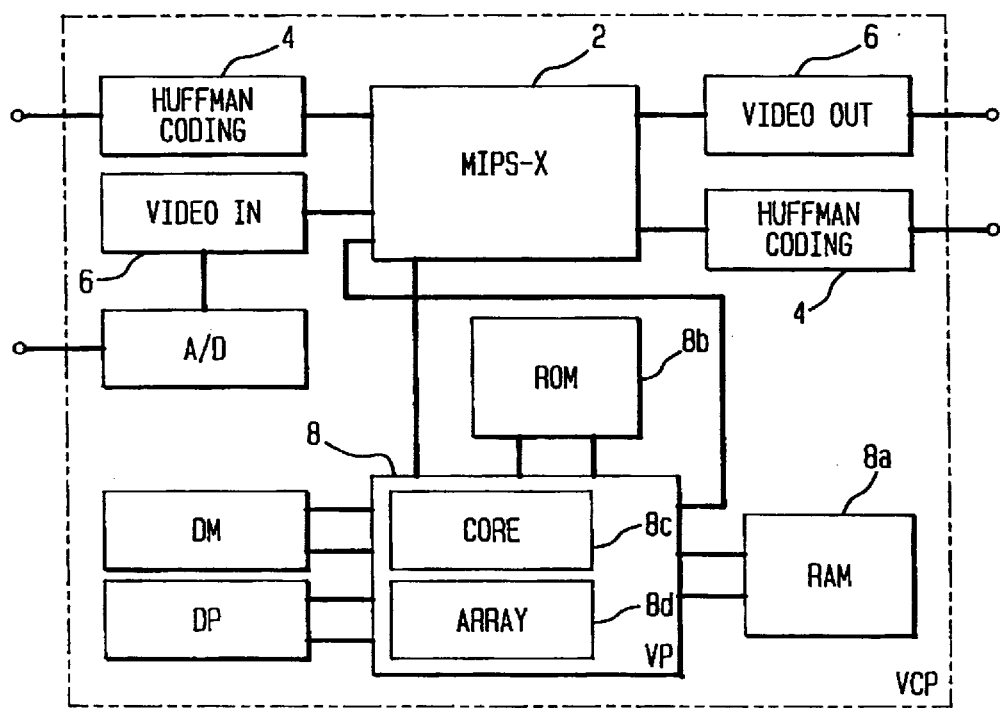
FIG. 4b is a block diagram of a videophone image compression processor used in the image compression system in accordance with the present invention.

Preferably, a VCP unit made by Integrated Information Technology, Inc. is used. The VCP unit provides eight bits for each pixel value and contains a MIPS-X general-purpose RISC-type processor. The MIPS-X processor 2 acts as the controller for the rest of the VCP unit: Huffman encode/decode units 4, video input/output signal-conditioning units 6, and a dedicated Vision Processor (VP) array co-processor 8, as shown in FIG. 4b.

The VP co-processor runs assembly-language subroutines in local RAM 8a. Special-purpose VP routines are stored in ROM 8b, for the sake of efficiency. The VP co-processor has two 1-kilobyte internal memories: DP where the template matrix (T) is stored, and DM where the edge-map matrix (M) is stored. A RISC-type core-function section 8c in the VP operates in parallel with an array-function section 8d providing four multiply-accumulate actions/instruction cycle.

The most powerful special-purpose instruction of the VP co-processor instruction set is the motion compensation instruction (mc). In one instruction cycle, the mc instruction reads 16-byte values from each of the two internal memories and:

1) subtracts all 16 bytes, pairwise;
2) converts remainders to absolute values;
3) adds all of the absolute values together; and
4) adds the new absolute-value sum to the accumulator.

The other instruction that is particularly advantageous for use in feature tracking operations is the macq instruction used to assign values used in the binary edge map 20. The macq instruction is available in VCPs manufactured by Integrated Information Technology Inc. Specifically, the macq instruction multiplies four pairs of 8 bit numbers in parallel. Each pair of numbers has an associated register. If the multiplication result of a pair of numbers is positive then the multiplication result of that pair of numbers is added to the contents of the corresponding register for that pair of numbers, otherwise if the multiplication result for that pair of numbers is a negative number it is not accumulated in the corresponding register for that pair of numbers.

The match metric of the present invention is calculated in 20 cycles using the mc instruction of the VP processor, including the 4 cycles used for overhead operations. Conventional floating-point binary-correlation calculations require almost 100-times more instructions, thus increasing the cycle time for each search by nearly two orders of magnitude. Since this match metric calculation is accomplished so rapidly and is the most complex computational element in the ellipse-tracking process needed for semantic compression, implementation of the entire real-time ellipse tracking routine uses only 3 machine instructions per second (MIPS) in compression-processing delay.

The format conversion required by a given video-image frame is automatically determined by the system, and is carried out by CifExpand and a DecimateToEllipse routines in the VP unit using tap values stored by the DP unit. For example, when a CIF-format image matrix of 352×288 pixels (pels) is processed by the VCP unit, the image matrix is first edge-trimmed by 16 pels on each side to 320×288 pels. These two 16×40 trimmed-pixel matrixes are then held in reserve to restore the convolution border produced in the edge-detection step. The trimmed image matrix is then decimated by a factor of eight to the 40×36-pel matrix size required by the DM memory unit used by the SIMD Vision Processor (VP) co-processor section of the VCP unit. However, the VP co-processor uses a twelve-tap separable filter to decimate each 40×36 pixel partition of the edge-trimmed CIF matrix transferred to it into 4×4 blocks:

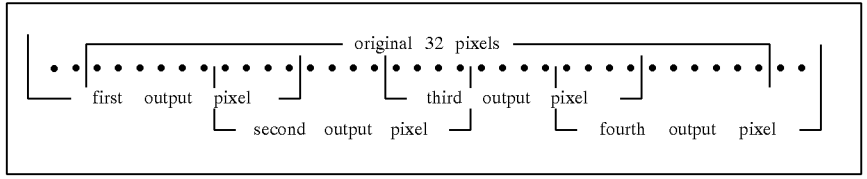

Those 4×4 blocks are transferred from the VP co-processor into the DM memory, where they are accessible to the MIPS-X processor, as 8×4-pel blocks. The right-most four pixels in these 8×4 blocks are padded out with garbage and overwritten by the next 8×4 output block. Also, the background masking process operates on an 8×8 block. Thus, the buffer holding this output array must be 44×40 to hold the 40×36 decimated array of image pixels.

This reduction of the dimensions of the luminance matrix for each frame by the decimation at 16 reduces background edge noise and also speeds compression processing because the ellipse-search operation is then performed on a smaller array. It has been found that this reduction does not interfere with facial tracking because the facial edge is reliably the strongest. edge in the head-and-shoulders images common in videophone applications. Thus, the facial edge remains detectable at very low resolutions.

Preferably, the subsequent edge-coding operation 19 uses the standard 3×3-pel Sobel vertical and horizontal high-pass filter matrixes. The Sobel operators are applied by the pixel-processing unit (PPU) of the VP co-processor to a 38×34 image centered in the 40×36-pel matrix to map luminance edges. The values of each element in the resulting horizontally and vertically filtered matrixes are then squared and summed, to combine them, in a manner well-known in the art. Array elements where these sums are greater than a given threshold value are then coded as edge pixels (+k) in the resulting 38×34-pel edge map, whereas array elements where these sums are less than or equal to the given threshold value are coded as non-edge pixels (−k). Unlike the values used in the conferencing codec's thresholded binary edge map, these two edge-pixel values cannot be 1 and 0.

Preferably, the edge map is coded using the "macq" command of the VP unit. However, the VP macq command produces a 38×34 binary map. The one-pixel-wide convolution border is reduced by shifting the binary map up and to the left by one pixel. The last two rows on the bottom and right-side of the resulting edge map then contain garbage values that are ignored. This shift must subsequently be reversed, when locating the macroblocks centered in the ellipse template location that provides the best match metric.

Background Control

With further reference to FIG. 4a, before the search for best fit at 52 the codec uses an ObjectMask routine to simplify the spatio-temporal complexity of the video image in each frame. The ObjectMask routine removes cluttered backgrounds that are static relative to the phone's user to assure robust face and skin-color tracking operations. In carphone applications, however, backgrounds that move relative to the user would be selectably removable instead.

A motion compensation step is applied in some prior art systems. Of course this extra step is time-consuming and, for the head-and-shoulders images of stand-alone videophone platforms, I have found that semantic compression in accordance with the present invention is sufficiently robust to make both the Global Motion Estimation (GME) compensation step and the face-symmetry test 28 applied in FIG. 1 to verify the facial ellipse detected by that prior art system to be unnecessary. However, a motion compensation routine such as the Global Motion Estimation (GME) routine 38 would useful in systems having portable cameras or zoom to correct for the type of large image displacements they produce.

Background elimination in accordance with the present invention, using the ObjectMask routine 21, however, provides a significant performance improvement for H.623E-type video compression, particularly for the sort of moving backgrounds that are often produced by wireless videophone units. The codec achieved 86% successful face and body tracking. In contrast, H.623E-type tracking was only 10% successful without this background removal step 21.

The ObjectMask routine 21 compares the edge pixels found by Sobel high-pass filter operators 19 to stored intensity values for each such pixel to generate a background-object mask that is factored into the current edge map 20 to provide a foreground edge map 22. Pixels that have not varied in intensity by more than a threshold amount within a given number of previous frames are included as background pixels in the object mask used by the ObjectMask routine 21.

Specifically, all background pixels in the mask are assigned a zero value and the others, non-zero. ObjectMask 21 then eliminates all edge-pixel values in the current edge map 21 corresponding to background pixels in the mask by multiplying them by the zero value of the background pixels in the mask. This zeros out those edge pixels, thus removing them from the foreground edge map 22.

The optional GME routine 38, in contrast, makes knowledge-based temporal adjustments to stabilize the position-reference coordinates of the video-image frame, frame-to-frame. Specifically, GME calculates displacements for frame sequences as frame-to-frame displacements in the tracking data calculated for each frame. GME then adjusts the coordinate axes of succeeding frames to overlay the tracking data derived from earlier frames. This minimizes change from frame to frame in the image semantics used for quantization, further assuring consistent coding of objects within the video frame sequence.

Off-line Template Definition/On-line Feature Searching

In the currently preferred embodiment, ten templates representing ten different elliptical face shapes are provided in each of three different sizes: 16×16, 16×24, and 24×24 pel for the 40×36-pel edge-map. For example, if a pattern P1 has major and minor radiuses of 8 and 10, then the template is 16×16; if 17×20, then 24×24. These template sizes are particularly selected for use with head-and-shoulders videophone-type images; the largest template covers two-thirds the length and over half the width of the image-frame edge map. The smallest is somewhat less than half the size of the edge map.

A respective ellipsoid face-edge pattern $P_x$ is selected for each ternary template $T_x$, and contiguous, concentric inner and outer perimeters $P_i$, $P_o$ of the pattern are defined off-line at 50a, as shown in FIG. 4a. Top and bottom distance arrays, shown in FIG. 5b, for each outer perimeter $P_o$ are also defined at this time. These arrays are discussed further below with reference to the routine that identifies ellipse-centered macroblocks 30.

The lower portion of the perimeters $P_i$, $P_o$ in each pattern $P_x$ is then dithered at 50b. After dithering, pixels in the upper portion of the remaining contours $C_i$, $C_o$ of the respective perimeters in each template $T_x$ are more likely to be contiguous with other pixels from the same contour $C_i$ or $C_o$ than are the pixels in the lower portion of those contours, where those pixels are both fewer and farther between. For example, if one pattern contour has 11 pixels, 8 in the top half and 3 in the bottom, an edge contour that is present in pixels corresponding to only 75% of the top pixels of the pattern contour will still have a match metric of approximately 6/11, higher than the 3/11 produced by an edge contour that is present in all pixels in the bottom half of that same pattern contour. The two sets of pixels in the remaining contours of the inner and outer perimeters in each ellipse template $T_x$, are assigned values of +2k and −2k, respectively. The remaining pixels in each template $T_x$ are background pixels and are assigned a value of 0k, as shown in FIG. 5c. The subfactor for the template is also determined at 50c. All of this is then stored for use on-line, in the real-time video image coding shown in FIG. 4a.

To find the best fit, the templates $T_1$ to $T_x$ are individually compared to a sequence of search positions on the foreground edge map of the given video frame, twice if necessary, by a FindEllipse routine. Each template is moved across and down the background-free edge map to positions 1 pixel apart. At each search position on the edge map 22, the values assigned to pixels of the template and the values assigned to corresponding pixels in the edge map 22 are evaluated by subtracting the values of the corresponding pixels to produce a respective occupancy matrix.

A different occupancy matrix is produced by the VP array processor 8 for each position of each template on the edge map for each image frame of a sequence of video image frames. The occupancy matrix contains absolute values from k to 3k that are the remainders of that subtraction for each pixel in the template.

The VP co-processor limits the resulting pixel values in the occupancy matrix such that |±3k|>256. The scalar constant "k" is selected to assure an integer result from the match-metric calculation that does not overflow the co-processor's accumulator. For the largest, most detailed template having pixels (i,j):

$$\sum_{i=0}^{24} \sum_{j=0}^{24} 4k < \text{limit}$$

Local/Global Searching

Preferably the templates $T_x$ are first evaluated in the neighborhood of the "last-best face" template location 52a on the edge map 22, which is the location that produced the "last best face", the best-match-metric location found in the preceding video frame. That neighborhood search 52a includes all macroblocks that were identified at 30 as being centered in that "last best face" ellipse 30 when that previous frame was processed. If the best match metric found in this first pass 52a does not exceed a first predetermined threshold for the match metric at 54a, the foreground edge map is then searched globally at 52b. The best match metric found in the global search 52b is then compared at 54b to a second, somewhat higher predetermined threshold value, since no face was expected outside the neighborhood of the face located in the previous image frame. If all match metrics are below the respective thresholds, the best-fit template and position determined for the last frame are simply repeated.

The result of the evaluation of the foreground edge map 22 to each template, $T_1$ through $T_x$, in each of the template's search positions within a given edge map 22 is a set of occupancy matrixes, each containing a set of values between 0 and ±3k for that particular template in that particular position within the foreground edge map. In the occupancy matrix, the value −k results from occupancy of the interior ellipse pattern by a non-edge pixel ($N_I$); the value +k, from occupancy of the exterior ellipse pattern by an edge pixel ($E_E$).

The match metric MM determined using this occupancy matrix emulates, but is distinctly different from prior art floating-point correlation operations, such as the conferencing codec's fit index R described above. The match metric is approximately the same as the ratio of the weighted number contour pixels found in each perimeter on the edge map, relative to the actual number of border pixels found in the edge map, weighted to give a larger value to pixels found at the top of the curve. This match metric using the occupancy matrix, instead, is a function of the number of edge/exterior-pattern pixels $E_E$ and non-edge/interior-pattern pixels $N_I$ as reflected in the occupancy matrix. This is normalized for comparisons between templates, as a ratio to the total number of pixels $P_E+P_I$ in that template's pattern. The edge-exterior-pattern pixels $E_E$ in the occupancy matrix correspond to some of pixels assigned the value +k in the edge map. The non-edge/interior-pattern pixels $E_I$ in the occupancy matrix correspond to some of pixels assigned the value −k in the edge map. Preferably, the occupancy-matrix match metric MM is also scaled by an arbitrary constant that assures that the integer results of the match-metric computation are large enough so that the range of values produced by the match-metric computation selects only one best face:

$$MM = \alpha \frac{E_E + N_I}{P_E + P_I}$$

The routine called by the VCP unit command mc determines the occupancy matrix as multiple sets of eight pixels and adds all values in the occupancy matrix:

$$S = \sum_{i=0}^{X} \sum_{j=0}^{Y} |T_{i,j} - M_{i,j}| = 2k(N_I + E_E) + kXY$$

That summation can then be compared to the highest previous difference achieved in the evaluation of the given edge map by that same template and the larger absolute difference value stored with the coordinates (x,y) corresponding to the position of the upper left corner of the template, thus using only SAD operations in this search for the best fit.

When the search using a given template $T_x$ is completed, the SAD match metric normalizes the difference between the largest summation value found and the subfactor, as a percentage of the total number of pattern pixels in the interior and exterior perimeters of the given template, for a given level of precision "v", by multiplying the adjusted mc summation (S–kXY) by a "divfactor" and correcting the result by shifting that multiplication product rightward by "v" spaces:

$$\text{Divfactor} = \frac{2^v \alpha}{2k[P_I + P_E]}$$

Where the precision is v=16 in binary operations:

$$\text{Divfactor} = \frac{524288}{P_I + P_E}$$

For a given edge map, the current highest percentage for all templates is stored, along with the identity of the template and its best-fit position, and the coordinates (x,y) corresponding to the position of the upper left corner of that template.

As a SAD operation implemented in the VCP unit in accordance with a preferred embodiment of the present invention, this computation is implemented by the motion-compensation command "mc" operating on all template pixels $T_{i,j}$ and the corresponding edge map pixels $M_{i,j}$:

$$S = \sum_{i=0}^{X} \sum_{j=0}^{Y} |T_{i,j} - M_{i,j}| = 2k(N_I + E_E) + kXY$$

The subfactor "kXY" required for use with the "mc" command is a constant value, determined for each template off line at 50c when the templates are initially defined, reflecting the dimensions of the template scaled by the factor k. Thus both the integer-adjustment constant "k" and the total number of pixels in each template "XY" are independent of the video image frame. The match-metric threshold values Th1 and Th2 for evaluating the last best blocks search and the global search, respectively, are both determined off line at 50c and 50d and stored for use in on-line real time operations.

Identification of Ellipse-Centered Macroblocks

Once a best-fit location x, y for the best-fit template is determined to exceed either the first or second match-metric minimum, the ellipse-centered macroblocks in the pixel matrix are determined relative to the major and minor axes of the ellipse. However, because the edge map is a 38×34 sub image that was shifted up and to the left by one pixel relative to the 40×36 pixel matrix from which it was generated, the actual pixel matrix address of the template, as distinct from its location x, y, on the edge map is x+1, y+1.

The center of the ellipse $x_c$, $y_c$ is then determined, using the template dimensions appearing in its subfactor value kXY as: $x_c = X/2 + x + 1$ and $y_c = Y/2 + y + 1$. The center address is then translated onto CIF, QCIF or SQCIF frame axes, etc. of the incoming image frame in a manner well known in the art. Macroblocks having centers that are beyond the frame-axis distance equivalent to ±X/2 and ±Y/2 from the frame-axis center of the ellipse are eliminated from consideration. The macroblock centers that are within the range defined by the dimensions of the template X, Y are then tested to confirm their location within the ellipse pattern.

In addition to the subfactor values reflecting the dimensions of each template, arrays defining the dithered contours of the templates, a pair of horizontal arrays defining the distance between the top and the bottom of the outer perimeter of the ellipse pattern $P_x$ of each template $T_x$, and a central horizontal row of pixels in each respective template are also determined off-line. Where the exterior perimeter has two pixels, the conservative nearer-pixel distance is selected.

A negative value is assigned to the arrays outside the ellipse pattern $P_x$. Thus, if the x-coordinate of a macroblock center that lies within the bounds of the template but is 8-blocks' distance beyond or before the center of the ellipse, the y-coordinate of that same macroblock must be within an impossible distance of –1 of that x-axis, but if it is 3-blocks' distance before or after that center, the y-axis distance must be no greater than 5 or 6-blocks above or 4 or 5 blocks below, respectively.

Chrominance Tracking

When the best face is detected in the frame, the codec identifies all 16×16-pel macroblocks in the original image that have their respective centers located within that best face, as described above. This set of facial macroblocks then controls skin-color chrominance tracking. The skin-color (chrominance) tracking module 42 in the codec identifies an area of flat luminance within the U-chrominance and V-chrominance macroblocks 30 of each best-face ellipse. A range around the peak value of the chrominance values of pixels in those flat-luminance areas is designated as the "skin color" of that face. All macroblocks having chrominance pixel values within the designated chrominance range are then semantically defined by the codec as facial areas. Finally, the codec initiates finer quantization of all these perceptually critical skin-color areas by supplying parameters locating all the 16×16-pel macroblocks in the original image that have their respective centers located within those skin-color areas to both pre-filtering 31 and entropy coding 35 processes in the encoder. Skin-color chrominance tracking provides both a default semantic and a perceptual enhancement for facial-tracking. Using chrominance tracking, a skin-color remnant of a facial ellipse is coded as though it were detectable as an ellipse, even if it has moved outside its previously-identified area, so long as it has the chrominance of the last-best facial ellipse 40. All skin-color areas receive the same quantization as facial areas. Thus, for example, a neck area below the best-face ellipse and that person's hands will also be compression-coded as though they were part of a best-face ellipse, which improves the perceived cohesiveness of the image and provides better clarity for hand gesture.

The codec determines skin chrominance from the respective 16×16-pel (U) and (V) chrominance blocks having centers within the best-face ellipse by selecting macroblocks where the AC energy of the DCTs representing luminance values of 2×2 pixel blocks is below a pragmatically-determined AC-energy threshold $T_{EN}$. This cut-off limit avoids the inclusion of hair, eyes, eyebrows, etc. in the two chroma-intensity histograms ($C_B$, $C_R$) used for skin-color determination in that 2×2 block of pixels. A single peak chrominance value usually appears; in each histogram of these flat-luminance regions.

The range of values defining facial chrominance is then preferably determined statistically as one standard deviation above and below the mean value of each histogram. An estimate may be used in some applications. The estimate smooths both histograms with a simple low-pass filter, such as a sliding window average, and then on either side of the remaining peak value, an arbitrary distance is used to define the facial-chrominance range.

Pre-filtering the Image Frames

In preparation for edge detection, at block 17 the image array 18 was simply low-pass filtered for smoothing. However, rather than unnecessarily compromising the resolution in the skin-colored facial areas identified in accordance with the present invention, by using those low-pass filtered pixels for DCT encoding, the video compressor preferably provides a pre-filtering step 31, as shown in FIG. 4a.

The strength F of the pre-filtering operation performed is semantically controlled by a variable N, which is weakest for the largest values of N:

$$F = \frac{1}{(2+N)^2} \begin{vmatrix} 1 & N & 1 \\ N & N^2 & N \\ 1 & N & 1 \end{vmatrix} = \frac{1}{(2+N)^2} = |1\ N\ 1|^T \cdot |1\ N\ 1|$$

Unlike the improved ellipse-search operation, this is a direct implementation of the conferencing-compressor's pre-filtering step on an array-based processor.

Post-filtering the Image Frames

To restore the perceptually-critical skin-color areas more nearly accurately at the receiving end of the communications link, the locations of the skin-color-centered macroblocks are also preferably provided to the decoder for adaptive post-filtering 36 to remove blocking artifacts and mosquito noise in a manner that is sensitive to image semantics. A simple two-tap non-linear filter can be applied both vertically and horizontally to pixels $x_0$ inside each block boundary to remove the block artifacts, such as artifacts between blocks $x_0$ and $x_1$ where $y_0 = x_0 + f(d)$, for example. To prevent image boundaries from being smoothed, the filter's action is non-linear so that less filtering is done where image boundaries are most sharply defined:

$$d = \left(\frac{x_1 - x_0}{3}\right) * S$$

Preferably the filter factor S=0.4, which was found to give the best signal-to-noise ratio (SNR) result.

An epsilon filter is applied to the mosquito noise frame-by-frame. The optimal epsilon filter parameter is piecewise linear so that it is temporally adaptive, varying inversely with the image quality measured by SNR, so as not to globally under or over-filter:

$$y_{i,j} = x_{i,j} - 1/8 \sum_{k=-1, l=-1}^{k=1, l=1} f(x_{i,j} - x_{i+k, j+l})$$

The epsilon filter parameter is determined on line by the encoder using the SNR of the encoded frame relative to the original digitized frame, on line, and converting that SNR to a look-up table value giving the optimal filter value. The look-up table is calculated and assembled off line by the encoder. The optimal value for epsilon, and the location parameters that govern its application to the decoded image, are sent from the encoder to the decoder as overhead, side information included with the compressed video image in the encoded signal.

By 1) reformatting the image frames, 2) assigning complementary values to a conventional binary edge map generated from the reformatted image frames, 3) assigning complementary values twice as large to respective sets of contour pixels comprising the remaining contours of respective dithered dual-perimeters in a feature pattern on a zero-value background in a ternary-value template, and 4) using a topological block selection criterion, the present invention converts conventional cross-correlation tests for best fit into a simplified, distance-based absolute-value difference calculation process. The feature-tracking necessary for semantic compression in real time is thus transformed into an operation compatible with the powerful motion compensation instructions used by a conventional dedicated SIMD-architecture co-processor of the video compression processor unit.

Ternary match-metric evaluation of template fit emulates the weighting and binary cross-correlation previously used for floating-point semantic compression coding. Their decoded image frames are fully comparable, but the greater efficiency of the SAD computations available in SIMD processors make on-line image compression for consumer videophones feasible within the bit-rate constraints imposed by existing PSTN communications infrastructure.

The invention has been described with particular reference to a presently-preferred embodiment thereof. However, it will be immediately apparent to one skilled in the art that variations and modifications are possible within the spirit and scope of this invention. For example, the present invention is also applicable to other types of feature searches and sematic operations. The invention is defined by the claims appended below.

What is claimed is:

1. Apparatus for detecting edge contours approximating a given feature in a pixel matrix representing a given image frame, said apparatus comprising:

an edge detector for producing an edge map from the pixel matrix, said edge map having a first plurality of edge pixels and a second plurality of non-edge pixels, each pixel in one of said first and second pluralities of pixels having an assigned value of +k and each pixel in the other one of said first and second pluralities of pixels having an assigned value of −k;

a first feature template having a feature pattern including a first and a second feature contour, said first and second feature contours being contiguous with each other and having a plurality of pixels, each pixel in said first feature contour having an assigned value of −2k, each pixel in said second feature contour having an assigned value of +2k, and pixels in said first feature template outside said first and second feature contours having an assigned value of 0k; and an array processor for calculating sum-and-absolute-difference values between a block of pixels in said first feature template and a corresponding block of pixels on said edge map corresponding to said block of pixels in said first feature template at a given location of said first feature template on said edge map, and for using said sum-and-absolute-difference values to calculate an estimated correlation between edge contours on said edge map and said feature contours in said first feature template as a match metric.

2. The apparatus of claim 1, further comprising:

a dithered portion in said first and second feature contours of each feature pattern, said dithered portion of said first and second feature contours, respectively, having contours that are farther from other pixels in said respective contours than pixels in a non-dithered portion of said respective contours.

3. The apparatus of claim 1 wherein said edge map includes background edges, said apparatus further comprising:

means for detecting said background edges; and means for removing said background edges from said edge map before calculating said sum-and-absolute-difference values.

4. The apparatus of claim 1, further comprising:

means for calculating said estimated correlation between said edge contours on said edge map and said feature contours in said first feature template at a first and a second location of said first feature template on said edge map, respectively, said first location lacking at least some pixels from said corresponding block of pixels in said second location; and means for determining which of said first and second locations is a best-match location, said best match location producing a best match metric indicating that said best-match location provides a closest correlation between said edge contours and said feature contours in said best-match location of said first feature template among said first and second locations of said first feature template on said edge map.

5. The apparatus of claim 4 further comprising:

template storage apparatus for storing said assigned values of said pixels in said first feature template off-line, said template storage apparatus being operatively connected to provide said assigned values to said array processor, said array processor being adapted for calculating on-line said sum-and-absolute-difference values and said estimated correlations between feature contours in said first feature template and edge contours in respective first and second edge maps produced from respective pixel matrixes representing respective first and second sequential image frames in an on-line sequence of image frames and for determining a respective best match metric for said first and second sequential image frames on-line.

6. The apparatus of claim 5 further comprising:

edge storage apparatus operatively connected to said array processor for storing respective locations of said edge contours on said first edge map;

means for determining first and second sets of edge contours on said second edge map, said first set of edge contours being a set of edge contours having respective locations having moved more than a predetermined distance from corresponding edge-contour locations on said first edge map, and said second set of edge contours being a set of edge contours having respective locations having not moved more than said predetermined distance from said corresponding edge-contour locations on said first edge map; and means for removing one of said first and second sets of edge contours from said second edge map before calculating said sum-and-absolute difference values for a location of said first feature template on said edge map.

7. The apparatus of claim 1, further comprising:

a second feature template having a feature pattern different from said feature pattern in said first feature template, said array processor being adapted to calculate sum-and-absolute difference values and an estimated correlation as a match metric for said second feature template at said given location on said edge map; and normalizing means for normalizing each respective match metric produced by said estimated correlation calculated for each feature template and for comparing said respective normalized match metrics to determine which of said feature templates has a best match metric, said best match metric corresponding to a normalized match metric for a closest estimated correlation between edge contours in said location of said feature template on said edge map and feature contours in said feature template.

8. The apparatus of claim 7, further comprising:

subfactor storage apparatus for storing a respective subfactor for each feature template off-line, said subfactor storage apparatus being operatively connected to said normalizing means to provide said respective subfactors for use in normalizing said match metrics for comparing said normalized match metrics calculated for respective feature templates to determine on-line which of said feature templates has said best match metric for respective first and second edge maps produced from respective pixel matrixes representing respective first and second sequential image frames in an on-line sequence of image frames.

9. The apparatus of claim 7, further comprising:

reference storage apparatus for supplying said location of a feature template on a first edge map producing a best match metric for said first edge map as a last-best location, said first and second locations being locations on a second edge map including pixels corresponding to pixels in said last-best location on said second edge map, said first and second edge maps being produced from respective pixel matrixes representing respective first and second sequential image frames in a sequence of image frames, said first and second edge maps each having a respective best match metric.

10. The apparatus of claim 9, further comprising:

iteration control means for testing whether said best match metric for a given edge map exceeds a first minimum value, said array processor calculating sum-and-absolute-difference values for feature template locations on said second edge map not including said pixels corresponding to pixels in said last-best feature template location on said first edge map when said best match metric for said second edge map is less than said first minimum value.

11. The apparatus of claim 10, further comprising:

reference control means for determining whether said best match metric for said second frame exceeds a second minimum value, said second minimum value being lower than said first minimum value, said reference control means substituting said first frame for said second frame and substituting said last best location for a best location in said second frame when said best match metric for said second frame does not exceed said second minimum value.

12. Apparatus for providing a higher detail level to compression-coded pixels in a part of a given pixel matrix representing a video-image frame, said part including edge contours correlating with contours of a facial ellipse, said apparatus comprising:

an edge detector for producing an edge map from the pixel matrix, said edge map having a first plurality of edge pixels and a second plurality of non-edge pixels, each pixel in one of said first and second pluralities of pixels having an assigned value of +k and each pixel in the other one of said first and second pluralities of pixels having an assigned value of −k;

template storage apparatus for storing face templates, each of said face templates including an ellipse pattern having a first and a second ellipse contour, said ellipse contours being contiguous with each other, and each said ellipse contour having a plurality of pixels, each pixel in said first ellipse contour having an assigned value of −2k, each pixel in said second ellipse contour having an assigned value of +2k, and pixels in said face template outside said first and second ellipse contours having an assigned value of 0k;

an array processor for calculating sets sum-and-absolute-difference values between a block of pixels in each of said face templates and a corresponding block of pixels on said edge map corresponding to said block of pixels in each face template at a given location of said face template on said edge map, for using said sets of sum-and-absolute-difference values to calculate respective estimated correlations between edge contours on said edge map and said ellipse-contours in each face template in a first location on said edge map as a respective first match metric for said respective face template, for using said sets of sum-and-absolute-difference values to calculate respective estimated correlations between edge contours on said edge map and said ellipse-contour pixels in each face template in a second location on said edge map as a second match metric for said respective face template, for determining which of said first and second locations is a best-match location for each face template, said best match location producing a best match metric indicating that said respective best-match location has a closest correlation between said edge contours and said ellipse contours in said respective template, and for determining a best-match face template by comparing respective best match metrics produced by respective best-match locations of said face templates on said edge map;

normalizing means for normalizing said best-match metric calculated for each template before determining said best-match face template;

a coder for encoding pixels in said video image frame; and control means for locating facial pixels in a part of said image pixel matrix corresponding to edge pixels in said edge map that correspond to pixels in said ellipse pattern of said face template on said location on said edge map producing said best match metric, said coder being responsive to said control means for providing a higher detail level for said facial pixels.

13. The apparatus of claim 12, further comprising:

reference control means for determining whether said best match metric in a second frame exceeds a minimum value, and for substituting a first frame for said second frame and substituting a last-best face location in said first frame determined by said best-match metric for said first frame when said best match metric of said second frame does not exceed said minimum value.

14. The apparatus of claim 12, further comprising:

an encoder for providing an output signal including an encoded compressed video image and a face-reference location code for each image frame for controlling post-filtering of said compressed video image when said image is decoded, said face-reference location code indicating where said facial pixels are located.

15. A method for detecting edge contours approximating a given feature in a pixel matrix representing a given image frame, said method comprising the steps of:

producing an edge map having a first plurality of edge pixels and a second plurality of non-edge pixels, each pixel in one of said first and second pluralities of pixels having an assigned value of +k and each pixel in the other one of said first and second pluralities of pixels having an assigned value of −k;

defining a feature template having a feature pattern including a first and a second feature contour, said first and second feature contours being contiguous with each other and each of said feature contours having a plurality of pixels, each pixel in said first feature contour having an assigned value of −2k, each pixel in said second feature contour having an assigned value of +2k, and pixels in said feature template outside said first and second feature contours having an assigned value of 0k; and calculating sum-and-absolute-difference values between a block of pixels in said feature template and a corresponding block of pixels on said edge map corresponding to said block of pixels in said feature template at a given location of said feature template on said edge map, and using said sum-and-absolute-difference values to calculate an estimated correlation between edge contours on said edge map and feature contours in said feature template as a match metric.

16. The method of claim 15, further comprising the step of selecting a value of k to assure an integer result from the match-metric calculation an to prevent overflow in the co-processor.

17. The method of claim 15, wherein the largest and most detailed template (i, j) is defined in said defining step in accordance with:

$$\sum_{i=0}^{24} \sum_{j=0}^{24} 4k < \text{limit}$$

18. The method of claim 15, further comprising the step of subtracting said edge map from each template to form a respective occupancy matrix having pixel values between 0k and ±3k.

19. The method of claim 15, further comprising the step of evaluating the estimated correlation at each position of each template using a respective match metric that is a function of the total number of edge/exterior-pattern pixels and non-edge/interior-pattern pixels in the occupancy matrix computed for a location of a template.

20. The method of claim 15, further comprising the step of normalizing said sum of pixels in the occupancy matrix to a match metric expressed as a percentage of the total number of interior and exterior pattern pixels in the given template.

21. The method of claim 15 wherein said sum of pixels in the occupancy matrix is calculated as S−kXY, where:

$$S = \sum_{i=0}^{X} \sum_{j=0}^{Y} |T_{i,j} - M_{i,j}|.$$

22. The method of claim 21, wherein said calculation is implemented as a motion compensation "mc" command operating on template pixels $T_{i,j}$ and edge map pixels $M_{i,j}$.

23. The method of claim 21, further comprising the steps of:

converting S−kXY to a match-metric percentage value for a given level of precision "v" by multiplying (S−kXY) by a "divfactor" to calculate a multiplication product; and correcting the result by shifting the multiplication product rightward by "v" spaces:

$$\text{Divfactor} = \frac{2^v \alpha}{2k[P_I + P_E]}.$$

* * * * *